May 8, 1934.  E. W. DAVIS  1,957,490
AUTOMATIC CONTROL VALVE FOR FLUID OPERATED MOTORS
Filed Jan. 17, 1931     2 Sheets-Sheet 1
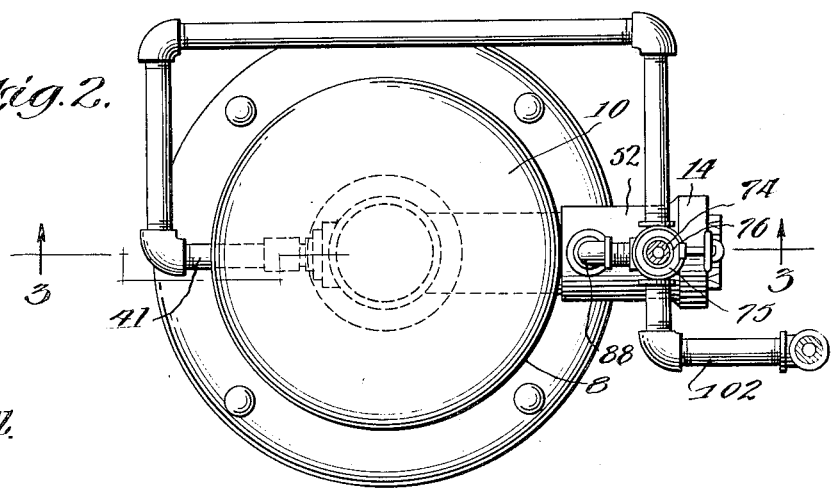
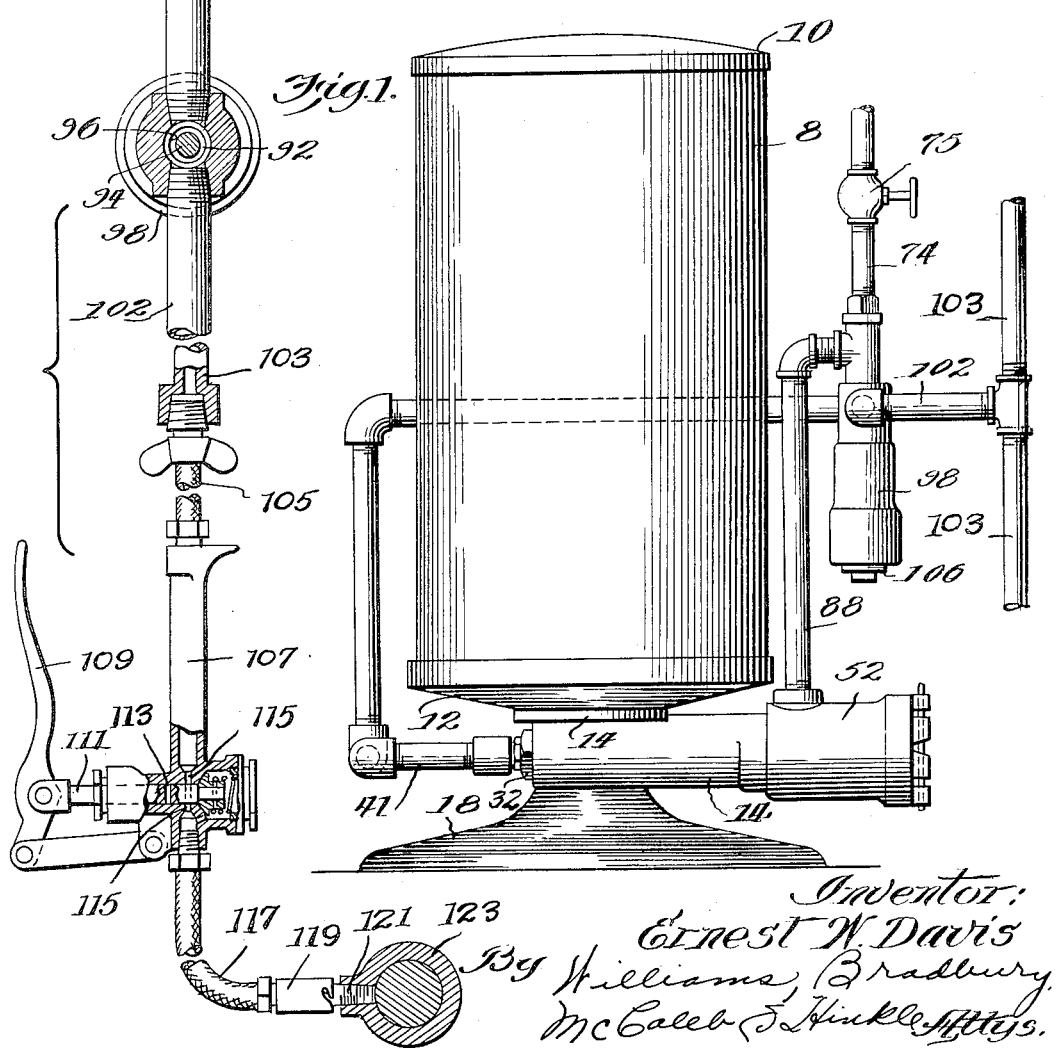

May 8, 1934.  E. W. DAVIS  1,957,490
AUTOMATIC CONTROL VALVE FOR FLUID OPERATED MOTORS
Filed Jan. 17, 1931  2 Sheets-Sheet 2

Inventor:
Ernest W. Davis
By Williams, Bradbury,
McCaleb & Hinkle
Attys.

Patented May 8, 1934

1,957,490

UNITED STATES PATENT OFFICE 1,957,490

AUTOMATIC CONTROL VALVE FOR FLUID OPERATED MOTORS

Ernest W. Davis, Oak Park, Ill., assignor to Alemite Corporation, Chicago, Ill., a corporation of Delaware Application January 17, 1931, Serial No. 509,324

6 Claims. (Cl. 137—153)

My invention relates generally to automatic control valves for fluid operated motors, and more particularly to improvements in valves for fluid operated pumps, which are adapted to admit the power fluid to the pump when the pressure in the discharge line of the pump falls below a predetermined minimum, and to shut off the supply of the power fluid to the pump motor when the pressure in the pump discharge line exceeds a predetermined maximum.

It is an object of my invention to provide an improved controlling means for pneumatically operated lubricant compressors and similar apparatus whereby the operation of the latter will be automatically regulated to maintain a predetermined pressure in its discharge line.

A further object is to provide an improved pressure controlled quick snap-over valve.

A further object is to provide an improved automatic control valve for fluid motors which is simple in construction and operation and may be economically manufactured.

Other objects will appear from the following description, reference being had to the accompanying drawings, in which:

Figure 1 is an elevation of the control valve and a lubricant compressor with which it may be used;

Figure 2 is a plan view thereof;

Figure 4 is a horizontal sectional view taken on the line 4—4 of Fig. 3.

Figure 3:
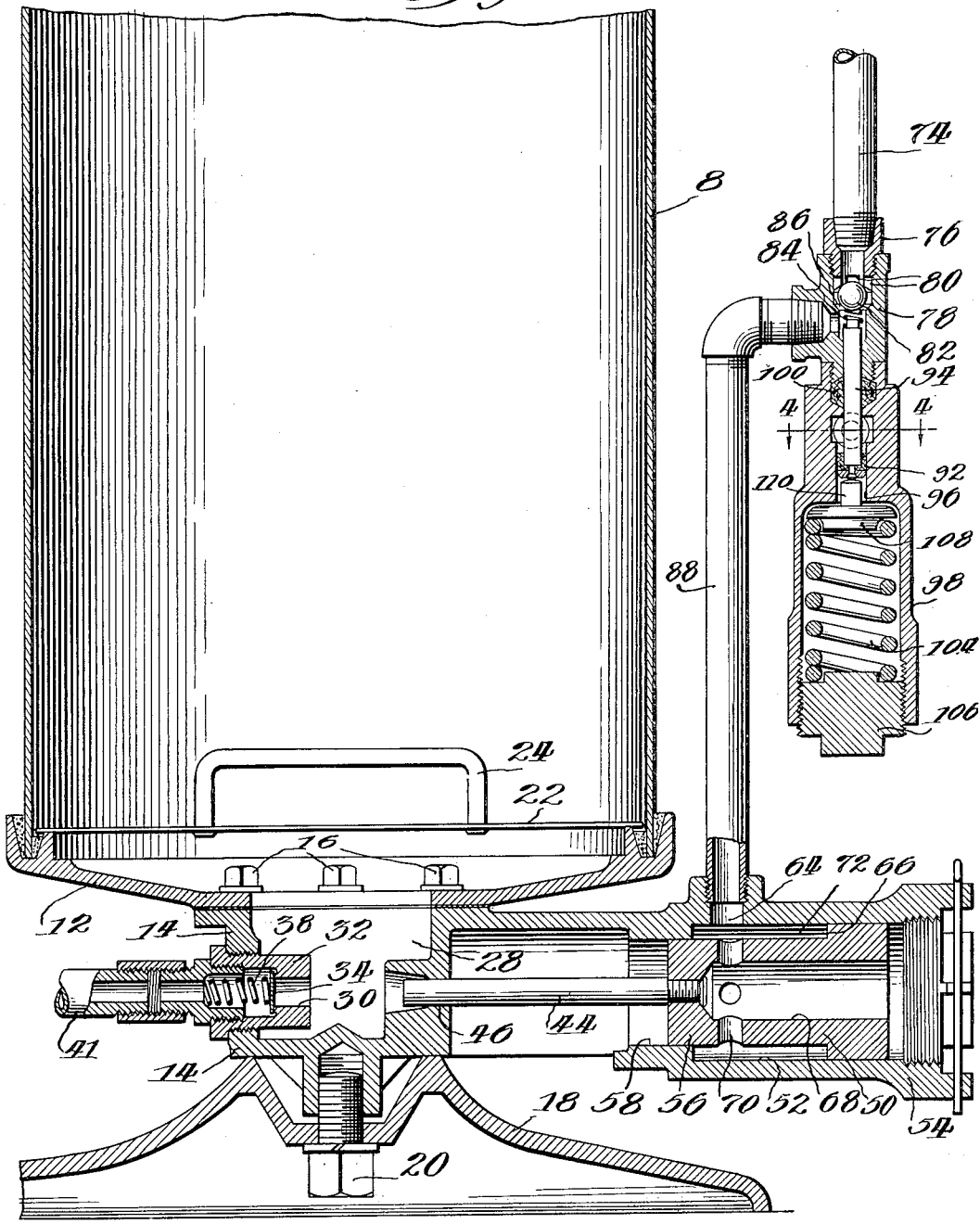
Figure 3 is a central vertical sectional view thereof taken on the line 3—3 of Fig. 2.

For the purpose of more clearly illustrating my invention, I have shown it in combination with a pneumatically operated lubricant compressor. This compressor comprises a cylindrical container 8 having a cover 10 and a bottom 12 which is secured to a suitable cylinder casting 14 by bolts 16. The cylinder casting 14 is detachably secured to a base 18 by a cap screw 20. A follower 22 having a handle 24 is adapted to rest upon the top of the lubricant and cause even feeding of the lubricant from all portions of the container 8. The cylinder casting 14 has a suitable supply chamber 28 therein which is in direct communication with the lubricant in the container 8.

While the compressor here shown is particularly designed for use with grease and other lubricants, the control valve of my invention may of course be utilized in connection with any pneumatic operated fluid pump or similar apparatus.

A cylinder 30 is formed in a bored plug 32 which is threaded in the cylinder casting 14. An outlet check valve 34 is held against the discharge end of the cylinder 30 by a spring 38.

A plunger 44 is guided in a cylindrical bore 46 in the casting 14, which is in registry with the cylinder 30. The plunger 44 is rigidly secured to an air piston 50 which is reciprocable within a cylinder 52 formed within a sideward extension 54 of the casting 14. The piston has a portion 56 of smaller diameter than the cylinder 52, this portion being guided in a bore 58. The piston has an annular face 66 which is normally subjected to the pressure of the air entering the cylinder through an inlet port 64, and the piston has an axial bore 68 and a plurality of radial passageways 70 connecting the bore 68 with the annular space 72 formed between the piston 50 and the cylinder 52.

The supply of air for operating the piston 50 is provided from any suitable source through a pipe 74, which may be shut off by a globe valve 75, the pipe being threaded in a bushing 76, and the bushing being threaded in an air valve body 78. The bushing 76 has a plurality of slots 80 cut in its lower end which permit passage of air past a ball 82 which is normally held against the end of the bushing 76 by a spring 84. A valve seat 86 is provided in the body 78 and is adapted to be covered by the ball 82 thereby to prevent passage of air from the conduit 74 to a conduit 88 which is in communication with a chamber 90 formed beneath the valve seat 76. The conduit 88 is connected to the inlet opening 64 of the air cylinder. The compression of the spring 84 is controlled by the pressure in the grease discharge conduit 41 which acts upon a cut leather piston 92 which is rigidly secured to a stem 94, the upper end of which is shouldered to form a seat for the spring 84. The cup leather piston 92 is reciprocable in a cylinder 96 formed in a casting 98 which is threaded to the lower end of the body 78.

Suitable packing 100 is compressed between the casting 98 and the body 78 to form a stuffing box for the rod 94. The discharge conduit 41 is connected to supply lubricant to the upper end of the cylinder 96. A conduit 102 is also connected at the upper end of the cylinder 96 and leads to any suitable means which may be used to supply the grease to the bearings, such, for example, as disclosed in United States Patents Nos. 1,408,573, 1,462,689, 1,463,861, 1,496,209, 1,563,609, 1,682,891, etc. In Fig. 4 the discharge conduit and valve construction such as shown in my above mentioned prior Patent No. 1,682,891 is illustrated as being supplied with lubricant from the compressor. This comprises a pipe 103 which is supplied with lubricant from the pipe 102, a flexible conduit 105, a valve having a hollow handle 107, an operating handle 109 for reciprocating a plunger valve 111, the latter having a port 113 which is adapted to register with corresponding ports 115 formed in the body of the valve to permit flow of lubricant from the compressor to a flexible discharge conduit 117. The conduit 117 has a coupling 119 at the end thereof which is adapted to be connected to a pin fitting 121 screwed into a bearing 123 to be lubricated. This valve is fully and clearly disclosed in my said patent and need not therefore be described in greater detail herein.

The stem 94 is normally held in its uppermost position by a spring 104, the lower end of which rests upon a plug 106 threaded in the lower end of the casting 98 and the upper end of which engages a member 108 which has a projection 110 protruding into the bore of the cylinder 92 and which engages the end of the stem 94.

The compressor is adapted to be used where a supply of air under moderate pressures is readily available and where it is desired to supply grease under high pressures for application to bearings. The compressor is adapted to maintain grease under high pressure in the discharge conduit automatically, accomplishing this purpose by automatically controlling the admission of air to the air cylinder.

In operation, the supply pipe 74 is connected to a source of air under pressure, which will normally flow past the ball valve 82, through the conduit 88 into the annular space 72 of the air cylinder, and cause reciprocation of the piston 50, as is more fully described in my copending application Serial No. 246,739, filed January 14, 1928, Patent No. 1,830,643, Nov. 3, 1931. The reciprocation of the piston 50 will of course cause discharge of lubricant from the end of the cylinder 30 past the check valve 34 into the conduit 41. The operation of the motor and pump will continue until pressure in the conduit 41 builds up above a predetermined maximum, when the lubricant pump will exert a downward pressure upon the cup leather 92 and against the compression of the spring 104 until compression of the spring 84 which holds the valve 82 upwardly is sufficiently released to permit the air which passes the ball to force it downwardly against its seat 86. As soon as the ball is seated, the air pressure will maintain it firmly upon its seat. When, however, the pressure in the discharge conduit 41 drops below a predetermined minimum pressure, the spring 104 will force the stem 94 upwardly and compress the spring 84 sufficiently to cause it to raise the ball 82 from its seat. The ball will move upwardly from the seat with a sudden snap, due to the fact that as soon as the valve leaves its seat, the pressure above the valve decreases slightly and the pressure below the valve increases. When the valve snaps open, the air under pressure is of course again admitted to the cylinder 52 and the pump immediately commences operation and operates until the pressure in the pipe 41 is again built up to the maximum permitted pressure.

It will be noted that, due to the construction of the control valve, there will be a considerable pressure range during which the compressor will not operate. In other words, the maximum pressure at which the valve 82 will be closed is a number of pounds per square inch greater than the minimum pressure at which this valve will be opened. Due to this differential, chattering of the valve is prevented and the number of times which the valve 82 operates is reduced. Another very desirable feature of the control valve mechanism is that the valve, when actuated, opens practically instantaneously to its wide-open position, thus assuring an immediate full supply of air under pressure to the motor. The maximum and minimum pressures in the pipe 41 which will cause closing and opening of the valve 82 may readily be varied by adjusting the tension on the spring 104 by means of the threaded plug 106.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a quick-acting automatic control valve for fluid operated pumps, the combination of a valve body having means for making connection to a fluid operated pump and means for admitting operating fluid under pressure to said body, a valve seat in said body, a valve cooperable with said seat, a spring having one end engaging said valve and operative in a direction to force said valve away from said seat toward said fluid admission means, a stem for supporting the other end of said spring, a piston connected to said stem operable to move the latter away from said spring to permit seating of said valve, a cylinder for said piston, means for connecting said cylinder with a fluid the pressure of which is to be utilized to control the valve, and resilient means opposing the pressure of said last-named fluid upon said piston.

2. In an automatic control valve for fluid operated pumps, the combination of a body having an inlet and an outlet port, a valve seat intermediate said ports, a valve cooperable with said seat and adapted to be pressed thereagainst by fluid pressure at said inlet port, a spring operative to move said valve from its seat against the fluid pressure at said inlet port, a member operable to compress said spring, resilient means exerting a force upon said member to move the latter in a direction to compress said spring, and fluid pressure operated means to decrease the force exerted by said resilient means.

3. In a quick-acting automatic control valve for fluid operated pumps, the combination of a body having an inlet and an outlet port, a valve seat intermediate said ports, a ball valve cooperable with said seat and adapted to be pressed thereagainst by fluid pressure at said inlet port, a stem operable in a direction to move said valve from its seat, a resilient connection between said valve and said stem, a piston secured to said stem and fluid pressure operated in the direction of seating of said valve, a cylinder for said piston, and resilient means operable upon said stem to move it in a direction to compress said resilient connection.

4. In an automatic control valve for fluid operated pumps, the combination of a valve body having inlet and outlet openings, a fitting threaded in said inlet opening and having a recessed end portion, a valve seat in said body, a ball valve cooperable with said seat and with the recessed end of said fitting, a spring having one end engaging said valve and tending normally to force said valve against the recessed end of said fitting, a stem supporting the other end of said spring, resilient means to move said stem toward said valve thereby to compress said spring and move said valve from its seat, and fluid pressure operated means for decreasing the effect of said resilient means.

5. In quick-acting automatic control valve for fluid operated pumps, the combination of a body having an inlet and an outlet port, a valve seat intermediate said ports, a valve cooperable with said seat, a spring having one end engaging said valve to raise it from its said seat, a stem mounted for reciprocation in said body and engaging the other end of said spring, a cylinder body threaded to said valve body and having a bore therein in axial alinement with said stem, means for admitting fluid under pressure to said cylinder, a piston secured to said stem and cooperable with the walls of said cylinder and operable through said stem and spring to permit said valve to move toward its seat, and adjustable resilient means for moving said piston and stem in the direction opposed to the pressure of fluid in said cylinder thereby to compress said spring and move said valve from its seat.

6. An automatic control valve for pneumatically operated motors comprising a body forming a part of the conduit for supplying air under pressure to the motor, a valve seat formed in said body, a valve normally forced to said seat by air pressure to prevent passage of air through said body, a reciprocable stem having its end positioned adjacent said valve, a spring mounted between said valve and said stem, resilient means acting upon said stem in a direction to unseat said valve, a cylinder, a piston reciprocable therein and operatively connected to said stem and means for admitting a fluid under pressure to said cylinder to move said piston in a direction opposing said resilient means.

ERNEST W. DAVIS.